United States Patent

Bayliss et al.

| [11] | Patent Number: | 5,487,325 |
|---|---|---|
| [45] | Date of Patent: | Jan. 30, 1996 |

[54] VEHICLE BRAKE SERVO BOOSTER WITH TRACTION CONTROL MODE

[75] Inventors: John P. Bayliss, Worcestershire; Sean Byrnes, Birmingham, both of England

[73] Assignee: Lucas Industries, England

[21] Appl. No.: 133,021

[22] PCT Filed: Apr. 14, 1992

[86] PCT No.: PCT/GB92/00685

§ 371 Date: Oct. 8, 1993

§ 102(e) Date: Oct. 8, 1993

[87] PCT Pub. No.: WO92/18366

PCT Pub. Date: Oct. 29, 1992

[30] Foreign Application Priority Data

Apr. 15, 1991 [GB] United Kingdom ............... 9107940

[51] Int. Cl.[6] ....................................... F15B 9/10
[52] U.S. Cl. ................................................. 91/376 R
[58] Field of Search ............... 91/369.1, 369.2, 91/369.3, 369.4, 376 R; 303/113.3

[56] References Cited

U.S. PATENT DOCUMENTS

| 3,175,235 | 3/1965 | Randol ................................. 91/369.4 |
| 3,719,123 | 3/1973 | Cripe . | |
| 5,096,268 | 3/1992 | Schiel et al. .......................... 60/568 |

FOREIGN PATENT DOCUMENTS

| 303470 | 2/1989 | European Pat. Off. ............ 303/113.3 |
| 1430518 | 11/1968 | Germany . | |
| 2089453 | 6/1982 | United Kingdom . | |
| 2230580 | 10/1990 | United Kingdom ................ 303/113.3 |
| 8604869 | 8/1986 | WIPO . | |
| 9000217 | 1/1990 | WIPO . | |

*Primary Examiner*—F. Daniel Lopez
*Attorney, Agent, or Firm*—Andrus, Sceales, Starke & Sawall

[57] ABSTRACT

A brake servo booster capable of operating in a traction control mode has a housing (100) containing a diaphragm assembly (500) which divides the housing into two chambers A and B. Supply of air to the diaphragm assembly is controlled by a valve mechanism which includes a reciprocable valve member (7) operatively connected to a force input member (5) actuated by a driver-operated control. The force input member includes two parts (11,12) connected respectively to the valve element and driver-operated control. The arrangement is such that operating force applied to the control is transmitted through both of the first and second input member parts (11,12) whilst a traction control operative mode is permitted by the second part (11) moving relative to the first part (12).

5 Claims, 2 Drawing Sheets

VEHICLE BRAKE SERVO BOOSTER WITH TRACTION CONTROL MODE

BACKGROUND OF THE INVENTION

This invention relates to a brake servo booster, primarily for use in providing power assistance in the actuation of a brake master cylinder of a vehicle hydraulic braking system capable of operating in a traction control mode, the booster being of the general kind in which the supply of air to a servo piston, usually in the form of a diaphragm assembly, is controlled by a valve mechanism which includes a reciprocable valve element operatively connected to a force input member actuated by a driver-operated control.

For the traction control mode, the booster is actuated automatically to apply the brakes without intervention by the driver and the connection between the force input member and the booster valve element must be such as to allow this to happen without significantly affecting the position of the brake pedal. An object of the invention is to provide a simple and convenient form of connection for this purpose.

According to the invention, the force input member of a booster includes two parts of which a first one is connected, in use, to the driver-operated control, and the second one to the valve element, the arrangement being such that operating force applied to the control member is transmitted through both of said first and second parts of the input member to the valve element, whilst operation of the booster in the traction control mode is permitted by the second part of the force input member moving relative to the first part.

In a preferred arrangement, the first and second parts of the force input member are telescoped together with one of the parts slidingly housed within a bore of the other part.

Typically, the valve element is housed within a hub connected to the servo piston, and the hub carries abutment means which engages a housing part of the booster to set the retracted position of the first part of the input member and thereby of the control member.

BRIEF DESCRIPTION OF THE DRAWINGS

The invention will now be described, by way of example, with reference to the accompanying drawings in which.

DETAILED DESCRIPTION OF THE PREFERRED EMBODIMENT

Figure 1:
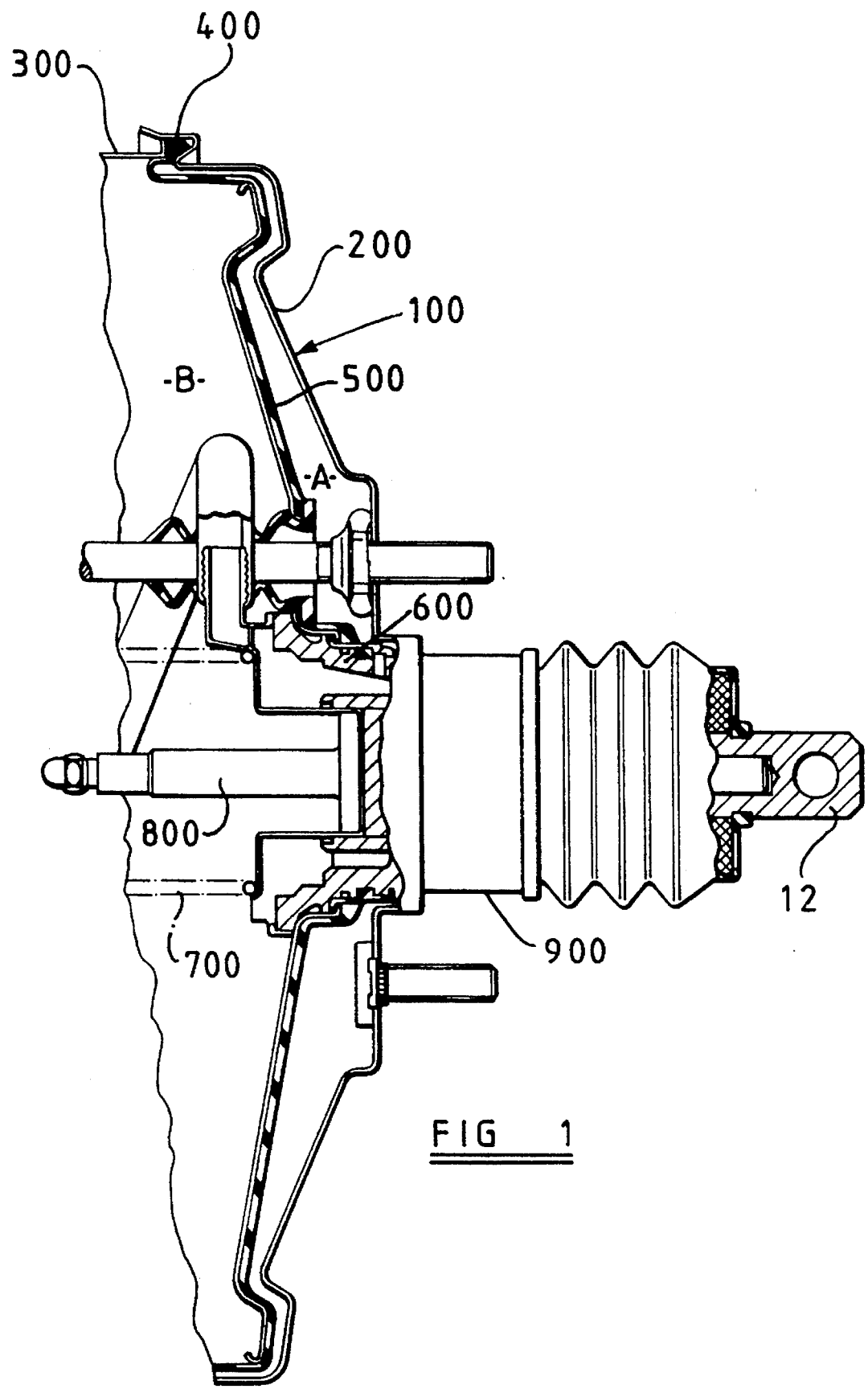
FIG. 1 is a side view, partly in longitudinal cross-section, illustrating part of one form of the booster of the invention.

Referring to FIG. 1 of the drawings, there is illustrated therein part of a brake servo booster of the invention having a housing 100 composed of a pair of shells 200 and 300 joined together at 400 in fluid-tight manner. The interior of the housing is divided by a diaphragm assembly 500 into two chambers A and B, the diaphragm assembly being carried by a hub 600 which would normally be urged by a return spring 700 to the right, as seen in the drawing. The hub 600 acts upon a force output rod 800 arranged to actuate a master cylinder (not shown) in conventional manner. The action of the rod is controlled by an arrangement of valves contained within a housing portion 900 of the booster and operated by a force input rod 5 connected to a driver-operated pedal (not shown).

Figure 2:
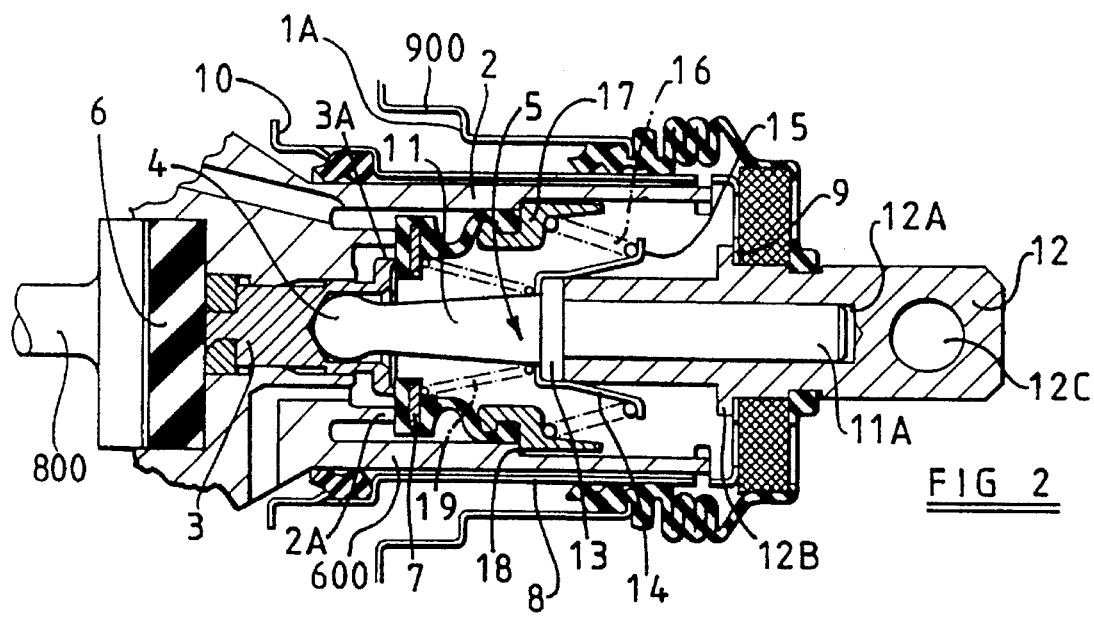
FIG. 2 is a view in longitudinal cross-section of part of the brake servo booster of FIG. 1 in a first operative condition.
Figure 3:
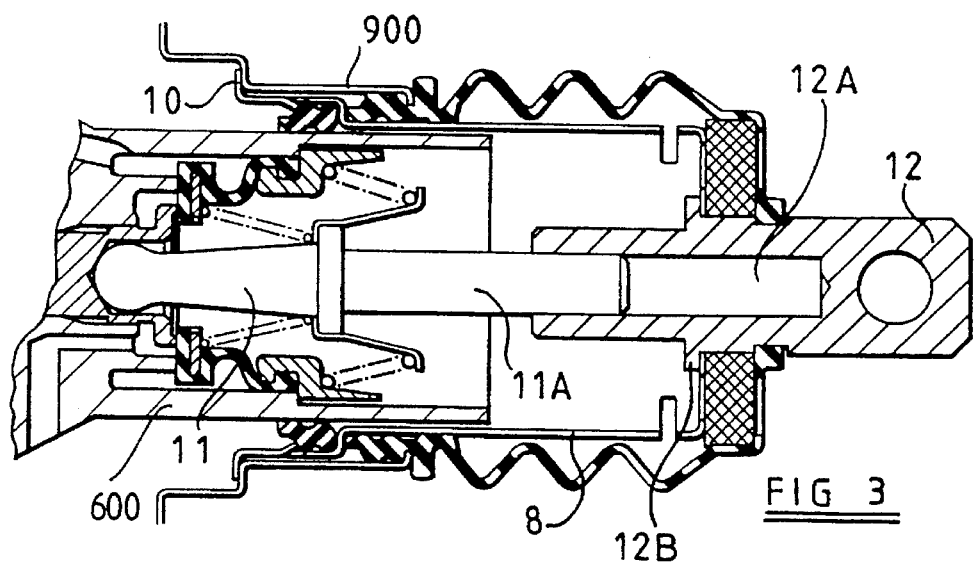
FIG. 3 is a view similar to FIG. 2 illustrating the booster in an alternative operative condition and in a traction control mode.

As can be seen from FIGS. 2 and 3, the hub 600 contains a valve control piston 3 which is allowed limited axial movement within the hub and to which is crimped, or otherwise secured a ball end 4 of the force input rod. A reaction disc 6 is interposed between the left hand end of the piston 3 and the force output rod 800. The extreme right hand end portion of the piston 3 forms a valve seat 3A and the hub 2 forms a further valve seat 2A, both seats being arranged to cooperate with a popper valve assembly 7, in conventional manner. Part of the hub 2 is surrounded in spaced relationship by a relatively thin gauge sleeve 8 of which a closed end 9 lies beyond the right hand end of the hub 2 and is engaged by a flange 12B of the rod part 12. The opposite end of the sleeve is formed with a radially outwardly turned flange 10 which acts as an abutment to set the retracted position of the input rod, in the manner to be described.

The force input rod 5 consists of two parts, of which a first part 11 carries the ball end 4 and has a reduced diameter stem 11A extending within an axial bore 12A of the second rod part 12 which is provided with an eye 12C to receive a clevis or similar connecting device by means of which the rod part 12 is connected to an operating pedal. A radial flange 13 on the rod part 11 abuts the inner end of the rod part 12 and forms an abutment also for a dish element 14 which surrounds the force input rod and extends therealong in a direction away from the rod part 11, the free end portion 15 thereof being turned outwardly to form an abutment for one end of a spring 16, of which the other end abuts a retainer 17 of the popper valve assembly 7 and urges the retainer into engagement with a shoulder 18 of the hub. A further spring 19 acts between the inner end of the dish 14 and the valve assembly 7 to urge the latter into engagement with the valve seats 2A and 3A.

When the operating pedal is fully retracted and the booster inoperative, the flange 10 of the sleeve 8 abuts the housing 900 at location 1A and thereby sets the retracted position of the force input rod 5 and pedal.

Operation of the booster for normal braking is effected by applying an input force to the part 12 of the force input rod 5, from which the force is transmitted to the flange 13 of the rod part 11, the latter acting on the control piston 3 in order to actuate the valves in conventional manner. Inward movement of the rod also moves the hub 600 inwardly and the abutment flange 10 of the hub becomes spaced from the housing 900, as can clearly be seen in FIG. 2. When the pedal is released, the hub and the various components return to the right until the flange 10 once more abuts the housing 900 to set the retracted position of the rod and pedal.

When the booster operates in the traction control mode, the hub 600 moves forwardly without any movement of the operating pedal, or of the rod part 12, the stem 11A of the rod part 11 sliding along the bore 12A of the rod part 12 to allow the rod part 11 to follow the hub. In this mode of operation, the hub 600 slides relative to the sleeve 8, leaving the latter with its flange 10 in abutment with the housing 900. At the cessation of the traction control mode, the hub returns to its innermost position within the sleeve under the action of the spring 700 (FIG. 1).

It will be seen that the invention provides an extremely simple and effective means of allowing the booster to operate in a traction control mode independently of the foot pedal, allowing the booster/pedal arrangement to remain identical with boosters not intended for traction control.

Since the input rod part 12 is located firmly relative to the sleeve 8, its retracted position is set by engagement of the sleeve flange 10 against the booster housing 900 and there is no necessity, therefore, for an adjustable back stop to be provided on the pedal. It will be understood that the arrangement of the rod parts may be reversed, with the part 11A sliding over the part 12, if desired.

We claim:

1. A brake servo booster for use in a vehicle hydraulic braking system comprising a servo piston which is connected to an output member and to which a supply of air is controlled by a valve mechanism which includes a reciprocable valve element connected to a force input member actuated by a driver-operated control device, the force input member including two parts of which a first one is connected, in use, to the driver-operated control device and the second one to the valve element, the arrangement being such that operating force applied to the control device is transmitted through both of said first and second parts of the input member by a direct mechanical connection therebetween to the valve element, whilst operation of the booster in the traction control mode is permitted by the second part of the force input member moving relative to the first part.

2. A booster according to claim 1, wherein the first and second parts of the force input member are telescoped together with one of the parts slidingly housed within a bore of the other part.

3. A booster according to claim 1, wherein the valve element is housed within a hub connected to the servo piston and the hub carries abutment means which engages a housing part of the booster to set a retracted position of the first part of the input member and thereby of the control device.

4. A booster according to claim 3, wherein part of the hub is surrounded by a thin-walled sleeve which carries an outwardly projecting flange at its end remote from the first input member part, the flange constituting the hub abutment means for engagement with the housing part.

5. A booster according to claim 4, wherein an end of the sleeve adjacent the first input member part is turned inwardly to provide an abutment for the first input member part in its rest position.

\* \* \* \* \*

UNITED STATES PATENT AND TRADEMARK OFFICE
CERTIFICATE OF CORRECTION

PATENT NO. : 5,487,325
DATED : January 30, 1996
INVENTOR(S) : John P. Bayliss et al It is certified that error appears in the above-indentified patent and that said Letters Patent is hereby corrected as shown below:

Claim 1, column 3, line 15, change "one" to --part--; lines 16-17, change "the (second occurrence) second one" to --a second part--.

Signed and Sealed this

Fourteenth Day of May, 1996

Attest:

BRUCE LEHMAN

Attesting Officer       Commissioner of Patents and Trademarks